United States Patent [19]

Kergosien et al.

[11] 4,253,115
[45] Feb. 24, 1981

[54] PROCESS FOR THE TRANSMISSION OF AN AUDIOFREQUENCY ANALOG SIGNAL DURING LINE-FRAME SYNCHRONIZATION INTERVALS OF A TELEVISION SIGNAL AND APPARATUS FOR PERFORMING THIS PROCESS

[75] Inventors: Jean-Marc Kergosien; François Le Carvennec, both of Paris, France

[73] Assignee: Thomson-CSF, Paris, France

[21] Appl. No.: 80,321

[22] Filed: Oct. 1, 1979

[30] Foreign Application Priority Data

Oct. 5, 1978 [FR] France .................. 78 28521

[51] Int. Cl.³ .............................................. H04N 7/04
[52] U.S. Cl. .................................................. 358/145
[58] Field of Search ............... 358/143, 145, 146, 147

[56] References Cited
U.S. PATENT DOCUMENTS 3,755,624  8/1973  Sekimoto ............... 358/145 X
4,191,969  4/1980  Briand et al. ............ 358/145

FOREIGN PATENT DOCUMENTS 2113933  6/1972  France
1268136  3/1972  United Kingdom Primary Examiner—Robert L. Richardson
Attorney, Agent, or Firm—Cushman, Darby & Cushman

[57] ABSTRACT

The transmission process comprises a coding of the sound signal consisting of converting it into words of n bits at a frequency double the line frequency and during each synchronization pulse transmitting four words of n bits corresponding to different samples, which introduces a redundancy of two and a decorrelation between the different samples. The process involves a decoding operation consisting of comparing the two representations of the sample transmitted during the two synchronization pulses and selecting one representation for each sample as a function of the result of the comparison.

11 Claims, 7 Drawing Figures

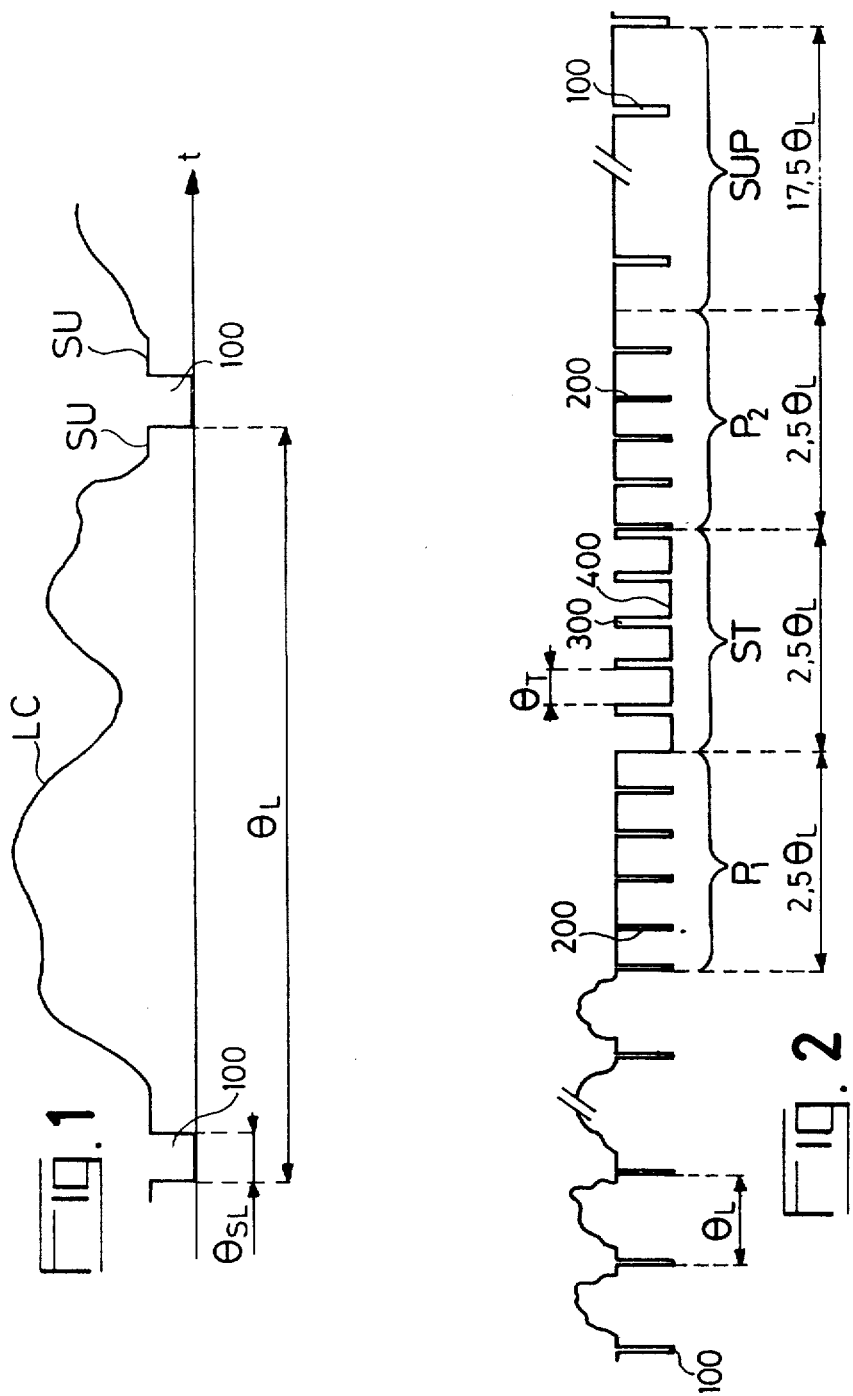

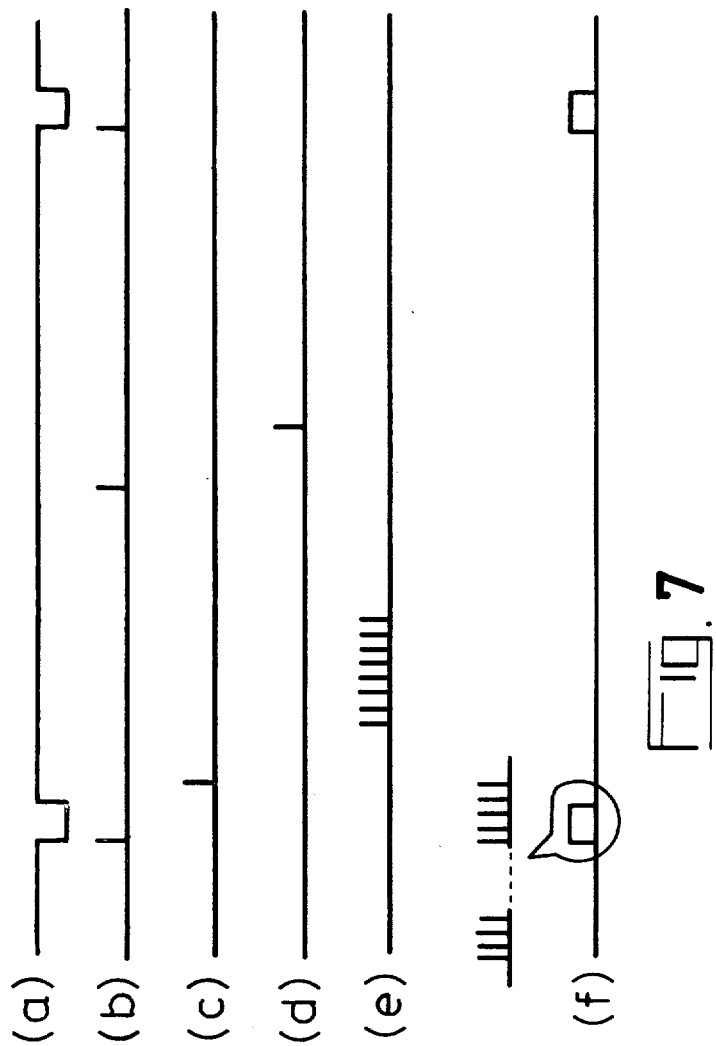

PROCESS FOR THE TRANSMISSION OF AN AUDIOFREQUENCY ANALOG SIGNAL DURING LINE-FRAME SYNCHRONIZATION INTERVALS OF A TELEVISION SIGNAL AND APPARATUS FOR PERFORMING THIS PROCESS

BACKGROUND OF THE INVENTION

The invention relates to the transmission of an audiofrequency analog signal during the synchronization intervals of a television signal, in particular with a view to its storage in a video disk, which also contains the information part of this television signal.

It is known to use the time space reserved for the synchronization pulses of the line and the frame by inserting into them binary operating signals such as image numbers, test signals, characteristic signals of the television program, etc. During each suppression portion of the video signal, it is also known to transmit a pulse amplitude-modulated by a low frequency signal translating the sound accompaniment of the television image. In the case of the recording of a television program, on an information carrier such as a video disk, it is useful to have the video signal on the one hand and the audio signal on the other on two separate channels which makes it possible to prevent any intermodulation and to possibly choose (for the same video program) between several audio programs having for example either different music or accompaniments or the speech part in several languages. When this is permitted by the same disk, it is possible to firstly inscribe the video signal and then the selected audio signal. It is also possible to carry out a multiplexing of two types of signals and to inscribe them simultaneously. The inscription of sound in the form of amplitude-modulated pulses does not make it possible to prevent during the reading of the disk the effects produced by the inevitable fading, information losses, noise, etc. However, the human ear has a very high sensitivity for such effects.

BRIEF SUMMARY OF THE INVENTION

The invention relates to a coding/decoding process for sound in the form of numerical or digital samples which introduces a redundancy in order to obviate the disadvantages of poor reception. The coding/decoding process can also be applied to a program other than a sound program in the audio frequency range. One of the features of the coding/decoding process is the delayed transmission of different representations of the same sample, which makes it possible to increase the tolerance on the duration of fading and consequently reduce the probability of errors due to uncorrected fading effects during decoding. Another feature of the invention is that it is compatible with the diffusion of numerical signals other than the sound samples, such as the operating signals referred to hereinbefore. The invention is not limited to the use of information carriers, such as the video disk. It is also applicable to any transmission or storage method initially provided for a television signal.

The invention relates to a process for the transmission of an audio frequency analog signal during the line synchronization intervals of a television signal, said transmission process involving a coding and a decoding operation, wherein the coding comprises sampling the analog signal in such a way as to convert it into words on n bits which follow one another at a frequency double the line frequency, storing at least four successive bits transmitting during each line-frame synchronization pulse a sequence of 4×n bits belonging to at least 4 words corresponding to different samples, transmitting at the start of each synchronization pulse before the sequence of 4×n bits a recognition sequence forming a predetermined word of p bits and producing a multiplex signal comprising the television signal without the synchronization pulses and the sequence of 4×n bits, whilst the decoding comprises detecting the recognition sequence, extracting the television signal, storing the sequences which follow the recognition sequences, comparing between them the different bits belonging to words corresponding to the same samples, supplying an analog signal coming from the words chosen as a function of the result of the comparisons, reconstituting the synchronization pulses and mixing them with the extracted television signal.

The invention also relates to an apparatus for performing this process.

BRIEF DESCRIPTION OF THE DRAWINGS

The invention is directed in greater detail hereinafter relative to non-limitative embodiments and the attached drawings, wherein show:

FIG. 1 showing the course of a television signal as a function of time.

FIG. 2 a graph showing the course of a television signal during frame suppression in the European standard.

FIG. 7 a series of chronograms of the different synchronization signals used in the coder of FIG. 6.

DETAILED DESCRIPTION OF THE PREFERRED EMBODIMENTS

Figure 3:
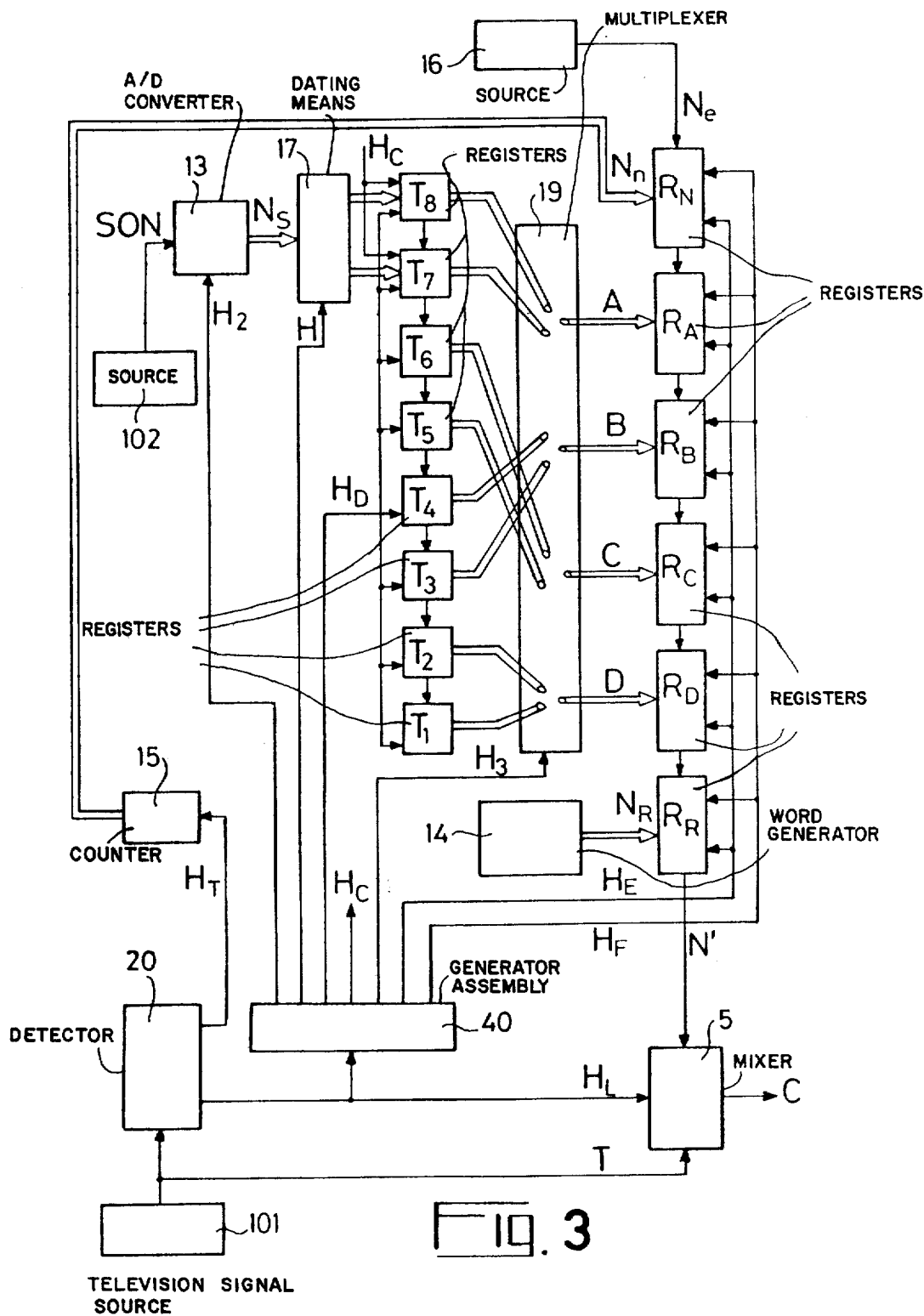
FIG. 3 a coder diagram for performing the transmission process according to the invention.

FIG. 1 is a graph showing the course of a television signal as a function of time. This signal results from super-imposing at clearly defined times of a composite video signal LC resulting from the superimposing of luminous signals and chrominance signals, which are frequency-modulated and with different subcarriers, a suppression signal SU separating the lines from one another and a line synchronization signal constituted by pulses 100 inserted in the suppression portions. In the case of the European standard, the duration of one line $\theta_L$ is 64 $\mu$s and the duration of pulses 100 $\theta_{SL}$ is approx. 4.7 $\mu$s. At the end of each half-image and at the beginning of the following half-image, the luminance signal is suppressed for 25 lines. The course of the television signal during frame suppression in the European standard is shown in FIG. 2. It consists of a first compensating portion P$_1$ for 2.5 lines formed solely of pulses 200 having the same polarity as pulses 100 of half the width and double the frequency. This is followed by the frane synchronization signal ST lasting 2.5$\theta_L$ formed by pulses 300 of opposite polarities to the above-mentioned pulses and of the same frequency and of width $\theta_{SL}$. This is followed by a second compensating portion P$_2$ similar to portion P$_1$. The continuation of the frame suppression period SUP is constituted by 17.5 lines comprising solely the line synchronization pulses of type 100. In the case where the type 100 pulses are of negative polarity a descending front detector sees during portions $P_1$ and $P_2$ and signal ST 15 descending fronts with a period $\theta L/2$.

Outside these 3 periods, it sees descending fronts with a period $\theta_L$. Such a detector is able to start up a coder which then generates a digital sequence resulting from information which it is desired to transmit for a duration equal to or below $\theta SL$ during pulses of type 100, equal to or below $\theta SL/2$ for the compensating portions and equal to or below $\theta_T = (\theta L/2) - \theta SL$ during signal ST. A mixer can then supply to the channel provided a multiplex signal comprising the video signal, with the exception of the synchronization pulses which provide no information and the digital sequences. The digital information can be of various types: operating signals, image number signals and coming for example from a counter which receives the frame synchronization signals extracted from the television signals, sounds coded for example in modulation by impulsion and coding (called MIC). It is possible to evaluate the binary flow which it is possible to transmit in this way knowing that a conventional video channel has a pass band of 6 MHz. Thus, it is possible to transmit 8.5 M bits/s, i.e. 40 bits during a line synchronization pulse of type 100.

FIG. 3 is a coded diagram for one of the possible uses of the invention. This relates to the case where it is desired to transmit for the duration of one line pulse a sound signal sampled at a rate of 2 samples of 8 bits per line. Thus, the sampling frequency is equal to double the line frequency f, which is 15625 Hz, i.e. sufficient to transmit the sounds in a band of 0 to 15 kHz. In view of the binary flow which it is possible to reach (at least 40 bits per line) there is to be a redundancy of the sound samples equal to 2. For the duration of one line pulse, 32 bits will be sound bits and the 8 or more remaining bits will serve for the transmission of miscellaneous information. At the start of each digital sequence N, a recognition sequence of 8 bits will be transmitted permitting, during reception, the detection of the start of sequence N and also permitting a distinction to be made between the two possible types of sequence depending on whether it replaces a pulse of type 100, 200 300 or a pulse of type 400, the sequences of the second type being longer. Moreover, in the case of the latter, following the sound bits there is to be a transmission of miscellaneous operating signals, more particularly a binary configuration representative of the image number. The coder shown in the drawing comprises a television signal source 101 of the type shown in FIGS. 1 and 2, a sound signal source 102 and various digital signal sources. It supplies a multiplex signal C. Source 101 supplies a television signal T, which can be frequency-modulated on a principal carrier. In this case, the multiplex signal C can be used as it is for storage or transmission, for example on a video disk, the sound being inscribed on the disk in digital form in place of the synchronization pulses. If, however, the television signal T has not yet been modulated, the multiplex signal C passes it into a frequency modulator before being used. A source 102 supplies a sound signal SON which is applied to an analog-digital converter 13 transmitting words $N_S$ of 8 bits at frequency 2f Converter 13 is synchronized by a clock signal $H_2$ of frequency 2f and the digital signal sources comprise:

a word generator 14 transmitting a recognition word $N_R$ of 8 bits a device 15, for example a counter, transmitting a binary configuration $N_n$ representative of the image number, said counter being started by the frame synchronization signal $H_T$ optionally, other binary signal sources such as source 16, which transmits the operating bits $N_e$.

Words $N_n$ and $N_e$ are only transmitted during pulses of type 400 clearly recognized on reception due to the recognition word $N_R$.

The connections between the different elements of the coder are represented by a single line in the case of a single connection carrying a single analog signal or a single bit. They are represented by a double line in the case of several connections carrying several bits in parallel forming words. Coding essentially relates to the signals $N_s$ from the converter 13. The words of n bits of each sample transmitted at the frequency 2f alternately load two 8 bit shift registers $T_8$ and $T_7$ under the influence of a dating means 17 synchronized by a square wave signal H of frequency f, which permits a line loading of each register $T_8$ and $T_7$. The loading time is determined by a lock $H_c$ of frequency 2f. The registers $T_8$ and $T_7$ form part of a series of 8 registers $T_8, T_7 \ldots T_1$ successively connected to one another in this order and whose shifts are controlled by a clock signal $H_D$ formed by a train of 16 pulses per line, making it possible to transfer all the bits loaded into the two registers $T_i$ and $T_{i-1}$ respectively into the registers $T_{i-2}$ and $T_{i-3}$. Registers $T_8$ and $T_7$ are completely unloaded after each new loading operation. The words contained in the 8 registers $T_1$ to $T_8$ are multiplexed in a multiplexer 19 synchronized by a clock of frequency f/2 having 8 word inputs and 4 word outputs A, B, C, D and operating in the following manner. For the duration of one line, outputs A, B, C, D are respectively connected to the outputs of registers $T_8, T_4, T_6, T_2$, whilst for the duration of the following line outputs A, B, C, D are respectively connected to the outputs of registers $T_7, T_3, T_5, T_1$. The words present at the outputs A,B,C,D respectively load the 8 bit shift registers $R_A, R_B, R_C, R_D$. Moreover, the recognition words $N_R$ load an 8 bit shift register $R_R$ and optionally words $N_n$ and $N_e$ load register $R_N$. Registers $R_N, R_A, R_B, R_C, R_D, R_R$ are connected in series in this order. Their loading is synchronized by a clock $H_E$ of frequency f and their shifts are synchronized by a clock signal $H_F$ constituted by a train of n pulses starting at the beginning of a synchronization pulse, n being the maximum number of bits which it is desired to transmit during synchronization pulses of type 200, the train duration being such that 40 pulses occupy max. 4.7 μs. Thus, the output of register $R_R$ at the end of the train of pulses $H_F$ and during the granted time all the digital information N which it was desired to transmit before a new loading of all the registers. Moreover, the words transmitted in the same digital sequence correspond to non-adjacent sound samples. Finally, it is readily apparent from the description of the operation of multiplexer 19 that the same sample is transmitted twice to different places in two digital sequences, themselves separated in time by a third digital sequence. The various clocks synchronizing the registers originate from a generator assembly 40 started by the line synchronization signal $H_L$ from a detector 20 receiving television signal T and detecting there the line pulses $H_L$ and the frame synchronization signal $H_T$. Mixer 5 is a gating means which receives signal T and the digital sequences N and whose output C alternately supplies signal T, with the exception of the synchronization pulses, and sequences N for the duration of its pulses. The gating means can be synchronized by the line synchronization signal $H_L$.

Figure 4:
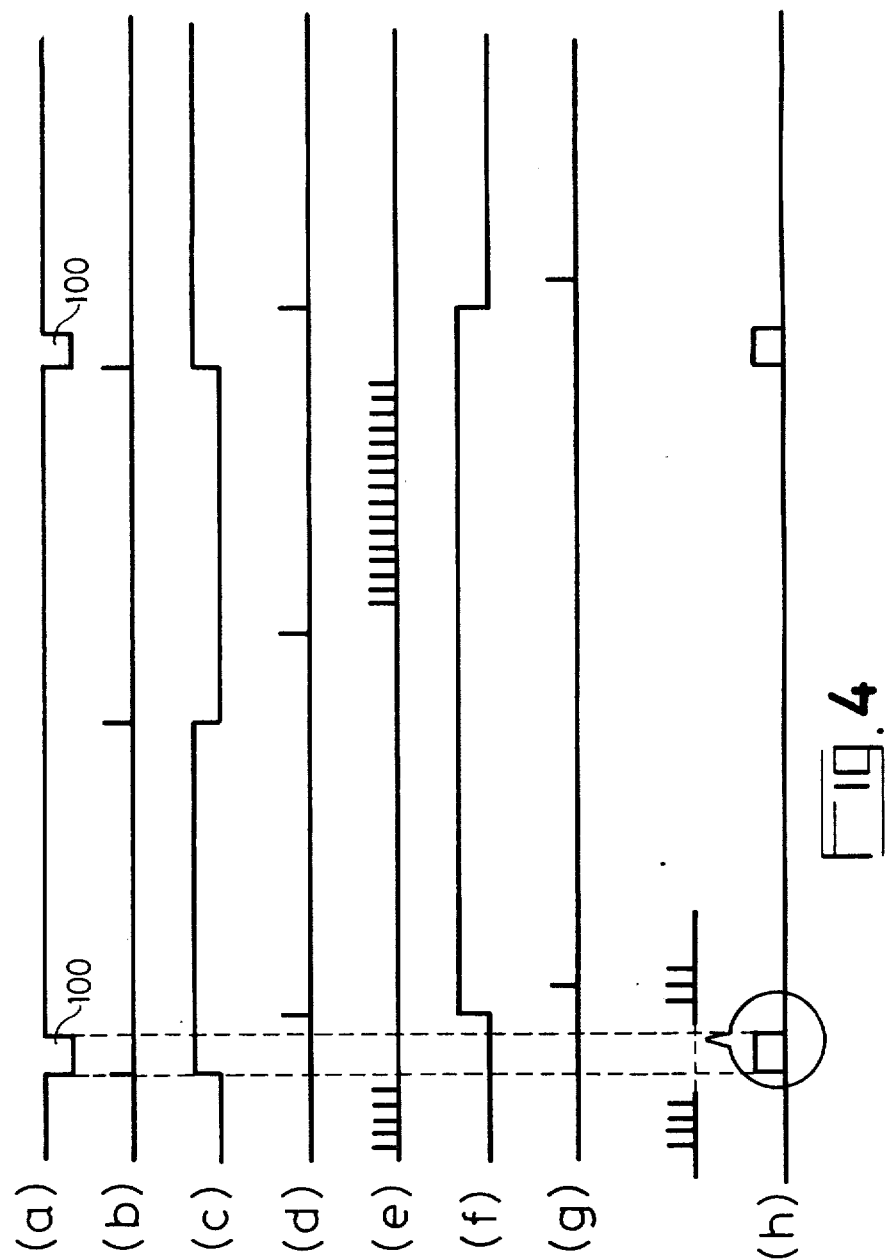
FIG. 4 a series of chronograms of the different synchronization signals used in the coder of FIG. 3.

In order to provide a better understanding of the operation of the coding member shown in FIG. 3, FIG. 4 shows the chronograms of the different clock signals: at (a) signal $H_L$ formed by synchronization pulses 100, at (b) signal $H_2$ which is the frequency signal 2f, whereby a sound sample is transmitted for each pulse of signal $H_2$, at (c) the square wave signal H of frequency f, at (d) signal $H_C$ which alternately starts the loading of registers $T_8$ and $T_7$ with a delay on clock $H_2$, at (e) signal $H_D$ which controls the displacement of registers $T_1$ to $T_8$ and whereof the end of the train of 16 pulses occurs before pulses $H_C$, at (f) the square wave signal $H_3$ of frequency f/2, at (g) the signal $H_E$ controlling registers $R_A$, $R_B$, $R_C$, $R_D$, $R_R$, $R_N$ with on clock $H_C$ a delay sufficient for there to be no pulse before the end of pulses 200, at (h) signal $H_F$ controlling the same registers and whose pulses occupy the time granted to sequences N: 40 pulses during pulses 100, the following pulses being useless for the end of the line and only being useful at the end of the frame where they partly or completely occupy the remainder of the duration of pulses 400.

Figure 5:
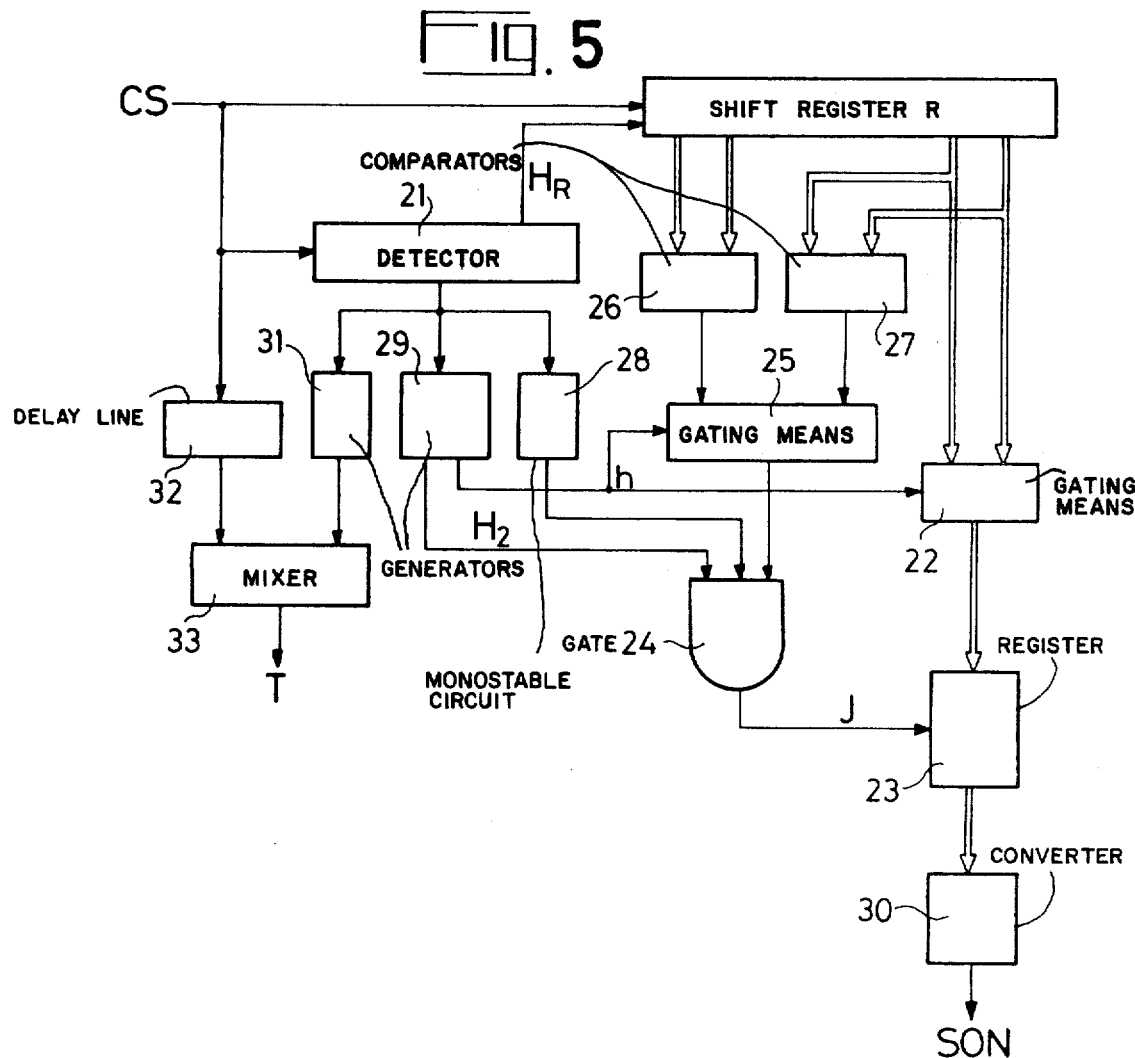
FIG. 5 a decoder diagram matched to the coder of FIG. 3.

FIG. 5 shows a diagram of a decoder matched to the coder described hereinbefore. The decoder receives a signal CS identical to signal C transmitted by the coder, which possibly carries the errors which have occurred during transmission. In the case where signal C has been frequency modulated, signal CS comes from a demodulator. Each digital sequence forming part of signal CS starts with a recognition word which is detected by a detector 21, which starts up various clocks. A clock $H_R$ controls the storage of the bits corresponding to sound signals. It consists of trains of 32 recurring pulses at frequency f, the frequency of the pulses being itself equal to the flow rate of the incident digital sequence, the start of the pulse train coinciding with the first sound bit. Clock $H_R$ synchronizes the displacements of a shift register R of 4×32 bits loaded in series. Thus, the register stores 4 digital sequences and by numbering the successive sound samples $E_1$, $E_2$ ... $E_i$ ... is displaced by the equivalent of one sequence per line. At the end of a train of pulses, the register R contains from the input towards the output binary configurations supposed to represent the following sound samples, i being a random integer: $E_{i+13}$, $E_{i+9}$, $E_{i+11}$, $E_{i+10}$, $E_{i+6}$, $E_{i+8}$, $E_{i+14}$, $E_{i+9}$, $E_{i+5}$, $E_{i+7}$, $E_{i+3}$, $E_{i+6}$, $E_{i+2}$, $E_{i+4}$, $E_i$. Thus, there are two representations for each of the samples $E_{i+6}$ and $E_{i+7}$, said two representations having been transmitted with an interval of 128 μs. The outputs of register R corresponding to the two represented words of sample $E_6$ are connected to a comparator 26. In the same way, the outputs corresponding to the two representative words of sample $E_7$ are connected to a comparator 27. One of the two representations of each sample is also transmitted to a gating means 22, whose output successively supplies the two samples and loads a memory 23, whose loading can be inhibited by a signal J. The content of memory 23 is unloaded twice per line into a digital-analog converter 30, which supplies the signal SON. Signal J comes for example from an AND gate 24, whose intputs receive on the one hand a binary signal resulting alternately from the comparison made by comparator 26 and that made by comparator 27, the selection being made by a gating means 25 operating at the same rythym as gating means 22: under the control of a square wave signal h of frequency f from a generator 29 started up by detector 21. During one of the alternations of signal h, the gating means selects the output of comparator 26 and gating means 22 selects one of the representations of sample $E_6$. If the two representations are identical comparator 26 supplies a binary level 1 and when the other inputs of gate 24 are also at level 1, signal J is at level 1 and register 23 can be loaded with sample $E_6$. If, however, the two representations are not identical comparator 26 supplies a binary level 0, signal J is at level 0 and the loading of memory 23 is inhibited, so that it retains the previous sample, namely sample $E_5$ (unless the loading of $E_5$ has been previously inhibited). During the following alternation of signal h gating means 25 selects the output of comparator 27 and gating means 22 selects sample $E_7$. As appropriate, memory 23 is loaded with sample $E_7$ or retains sample $E_6$. Gate 24 receives two other binary signals, one from a monostable circuit 28 tripped by the detection of the recognition word by detector 21. When this word is transmitted with errors the monostable circuit does not trip and its output remains at 0, so that the loading of memory 23 is inhibited. Register R is no longer loaded, so that 4 sample representations are lost, but as the samples are not adjacent, the consequences are less important. The other binary signal present at the input of gate 24 is a clock signal $H_2$ of frequency 2f supplied by generator 29, whose two pulses per line take place after the loading of a complete sequence into register R. To obtain the complete television signal from signal CS, it is necessary to reconstitute the line and frame synchronization pulses, which is carried out by a generator 31 started by detector 21. A delay line 32 compensates the delay introduced by the recognition word detection time. The delayed signal C3 and the synchronization pulses are applied to a mixer 33 which supplies the television signal T.

Instead of the complete bitwise comparison of the two representations of each sample, it is preferable to compare only the bits with the greatest weight, for example 4 bits instead of 8. Thus, in the case of non-identity if the error related to 1 low weight bit this error would not be detected by comparator 26 or comparator 27 and sample $E_6$ or $E_7$ would be loaded into the memory and then transmitted into converter 30, which would introduce a very minor error into the analog value obtained and is preferable to retaining the previous sample, whose analog value can be very different. However, in the case of an error on higher weight bits, the decoder would take no account of the sample in question and would maintain the previous sample.

Figure 6:
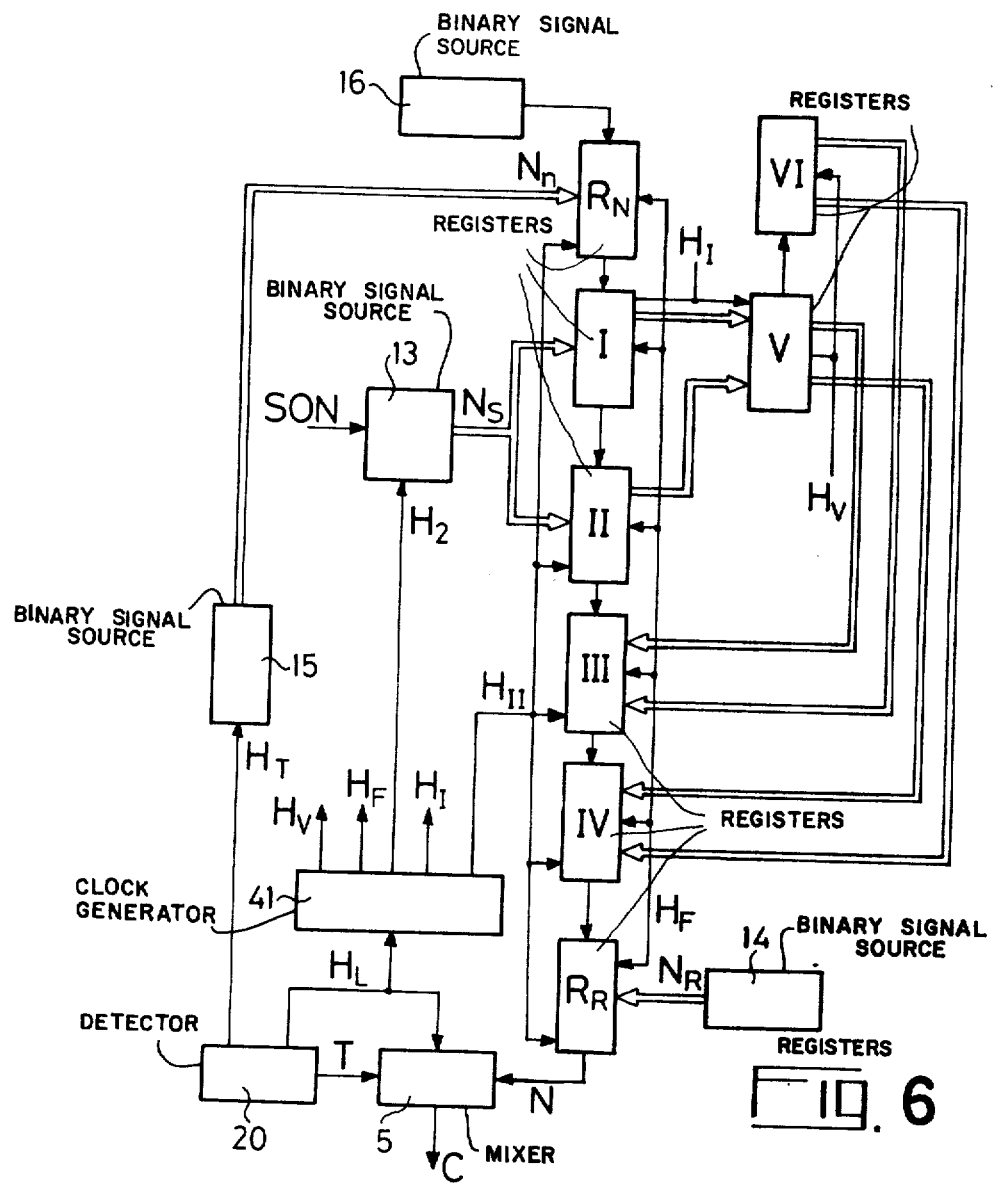
FIG. 6 a constructional variant of the coder.

In view of the fact that it is preferable to compare bits of the highest weight, rather than maintaining the previous sample in the case of non-identity of low weight bits no useful purpose is served by transmitting the two complete representations of each sample. It is merely necessary to transmit one complete representation and for example the 4 bits of highest weight of another representation. Thus, there are twice 4 bits available in each sequence, if the binary flow values of the pass band to be transmitted and the number of bits per sample remain unchanged. It is therefore possible to transmit a third representation of 4 bits of higher weight for each sample. The decorrelation of all the representations is still desirable, so that 22 bits can be transmitted comprising a complete representation of two samples and a partial representation of 5 samples, the 8 samples being different in such a way that each sample has 3 representations in 3 separate sequences, one complete and the other 2 partial. A procedure for obtaining a coder which fulfils these conditions is shown in FIG. 6. Certain elements are in common with those of FIG. 3 and carry the same references. There are the various binary signal sources 13, 14, 15, 16, the registers receiving non-sound binary signals $R_N$ and $R_R$, detector 20 and mixer 5. Certain synchronization signals are identical, namely $H_L$, $H_T$, $T_1$, $H_2$, $H_f$. The words $N_S$ corresponding to the sound samples and transmitted twice per line by the analog-digital converter 13 alternately load two 8 bit shift registers I and II, respectively controlled by loading clocks $H_I$ and $H_{II}$ of frequency f. At the same time as the loading of register I, the 4 bits of highest weight of each of the registers I and II load an 8 bit shift register V under the control of clock $H_I$. After the loading of register II and before the loading of register I, register V is displaced under the control of a signal $H_V$ formed by a train of 8 pulses once per line and its content is transferred into a register VI. At the same time as the loading of register II, i.e. under the control of a clock $H_{II}$, 4 bits of each of the registers $R_V$ and $R_{II}$ load an 8 bit register III, the 4 other bits of each of the registers $R_V$ and $R_{VI}$ load a register IV. Registers I, II, III, IV are connected in series in this order and are equivalent to registers $R_A$ to $R_D$ of FIG. 4. They are connected in the same way to registers $R_N$ and $R_R$ and the system undergoes at least 40 displacements under the action of clock $H_F$ during the line pulses just before the loading of register II. The various clock signals come from a clock generator 41 of the same type as generator 40 in FIG. 4, their chronograms being shown in FIG. 7: at (a) the line synchronization signal $H_L$, at (b) the signal $H_2$ of frequency 2f, at (c) the signal $H_{II}$ of frequency f for loading registers II, III, IV, $R_N$, $R_R$, at (d) the loading signal $H_I$, at (e) the displacement signal $H_V$, at (f) the displacement signal $H_F$. It is possible to gather from these chronograms that the words successively appearing at the output of register N are firstly the recognition word, as hereinbefore, then the representations of samples $e_i$, $e_{i+2}$, $e_{i+1}$, $e_{i+4}$, $E_{i+3}$, $E_{i+5}$, i being an integer incremented for each line. The small letter e is used for incomplete representations, i.e. only having the 4 highest weight bits.

The decoder matched to this type of coder differs only slightly from that of FIG. 5. A register memorises 3 successive sequences. In these 3 sequences there are two partial representations $\beta$ and one complete representation $\gamma$ of two samples. Two identical logic circuits each comprise 3 comparators and logic gates effecting for each sample the following comparisons: the 4 high weight bits of $\gamma$ forming a word $f$ are compared with $\alpha$ and $\beta$ and $\alpha$ and $\beta$ are compared with one another.

As a function of the results of the comparison, the logic circuit either validates the complete representation $\alpha$ or validates the partial representation $\alpha$ and controls the retaining of the low weight bits of the previous sample. The decoding process, which is more flexible than the previous process, leads to error levels which are lower than the highest weight bits. However, to obtain this result, it is preferable to further improve the coder described hereinbefore in its simplest form for reasons of the present description by decorrelating the various representations of the same sample by a longer time (at least 2 $\theta_L$ instead of $\theta_L$ as described hereinbefore). There are numerous decorrelation possibilities by increasing the number of shift registers in the coder and the total number of bits simultaneously memorised in the decoder, whilst using as a basis the decorrelation method used in the coder of FIG. 4.

The invention is not limited to the embodiments described hereinbefore and it is possible to have any apparatus permitting the performance of the previously described transmission process.

What we claim is:

1. A process for the transmission of an audiofrequency analog signal during the line synchronization intervals of a television signal, said transmission process involving a coding and a decoding operation, said coding comprising sampling said analog signal for converting it into words of n bits which follow one another at a frequency double the line frequency, storing at least four successive words, transmitting during each line—frame synchronization pulse one sequence of 4×n bits belonging to at least 4 words corresponding to different samples, transmitting at the start of each synchronization pulse before said sequence of 4×n bits a recognition sequence forming a predetermined word of p bits and producing a multiplex signal comprising said television signal without its synchronization pulses, said recognition sequence and said sequence of 4×n bits; said decoding comprising detecting said recognition sequence, extracting said television signal, storing the sequences which follow said recognition sequence, comparing between them the different bits belonging to words corresponding to the same samples, supplying an analog signal coming from words chosen as a function of the result of the comparisons, reconstituting said synchronization pulses and mixing said synchronization pulses with said extracted television signal.

2. A process according to claim 1, wherein the 4×n bits transmitted in each line during said coding operation belong to 4 words corresponding to different samples, two words corresponding to the same sample being transmitted in two non-consecutive sequences of 4×n bits.

3. A process according to claim 2, wherein during said decoding the comparisons relate to two pairs of words corresponding respectively to two successive samples, the words chosen for each sample being one of the two words of the pair in the case of identity between the two words constituting the pair and being the word chosen for the previous sample in the case of non-identity.

4. A process according to claim 1 in which n is an even number, wherein the 4×n bits transmitted in each line during said coding are constituted by 4 times the n/2 bits of highest weight belonging to 4 words corresponding to different samples and twice n bits belonging to two words corresponding to two other different samples, the comparisons performed during said decoding relating to two groups of 3 words corresponding respectively to two successive samples, said three words being two words of n/2 bits (A and B) and 1 word of n bits (C), said comparison relating to bits of words (A and B) and n/2 bits of the highest weight of word (C), said supplied analog signal corresponding, for each, to a word supplied from words (A, B and C) and the word selected for the previous sample, as a function of the results of the comparisons.

5. A process according to claim 1 for the transmission of digital signals during frame synchronization intervals, wherein the words corresponding to said digital signals are stored and transmitted following said 4×n bits during the line synchronization pulses included in said frame synchronization intervals.

6. A process according to claim 5, wherein the binary configuration constituting said recognition word differs as a function of whether it is transmitted at the start of a line synchronization pulse which may or may not be included in a frame synchronization interval, the detection of this word during decoding permitting the determination of the type of synchronization pulse to be constituted and the starting of the reception of the digital signals.

7. A system for the transmission of an audiofrequency analog signal during the line synchronization intervals of a television signal, said system comprising:
 one analog-digital converter for sampling said analog signal and converting said analog signal into words of n bits which follow one another at a frequency double the line frequency;
 one set of shift registers for storing at least 4 successive words and for transmitting during each line-frame synchronization pulse one sequence of $4 \times n$ bits belonging to at least 4 words corresponding to different samples;
 one supplementary shift register connected to the output of said set, supplied by a predetermined word of p bits and transmitting a recognition sequence constituted by said predetermined word;
 clock generating means synchronized by the line synchronization pulses for controlling the loadings and shifts of said registers;
 mixing means synchronized by the line synchronization pulses, connected to the output of said supplementary register and supplied by said television signal for providing a multiplex signal comprising said television signal without its synchronization pulses, said recognition sequence and said sequence of $4 \times n$ bits;
 decoding means receiving said multiplex signal for reconstituting said television signal and said analog signal.

8. A system as claimed in claim 7, in which said set of registers comprises 4 successive registers further comprising:
 8 shift registers of n bits ($T_8, T_7, \ldots, T_1$) connected in series in this order;
 switching means for supplying said words of n bits alternately to said registers ($T_8$) and ($T_7$);
 one multiplexer for once per line alternately connecting said 4 successive registers to said registers ($T_8$, $T_4$, $T_6$, $T_2$) and ($T_7$, $T_3$, $T_5$, $T_1$), respectively;
said clock generating means synchronizing said converter, said switching means, said multiplexor and said registers.

9. A system as claimed in claim 8, further comprising one source of digital signals and one shift register ($R_N$) connected to the input of said set and supplied by said digital signals; said mixing means being further synchronized by the frame synchronization pulses in such a way as, during the frame synchronization intervals, said multiplex signal comprises said digital signals following said sequences of $4 \times n$ bits.

10. A system for the transmission of an audiofrequency analog signal during the line synchronization intervals of a television signal, said system comprising:
 an analog-digital converter for sampling said analog signal and converting said analog signal into words of n bits which follow one another at a frequency double of the line-frequency, n being an even number;
 2 shift registers of n bits (I and II) connected in series in this order, alternately supplied by said words of n bits;
 2 shift registers of n bits (V and VI) connected in series in this order, said register V being supplied by the n/2 bits of heighest weight contained in said registers (I) and (II);
 2 shift registers of n bits (III and IV) connected in series in this order supplied with the words contained in said registers (V) and (VI), the input of said register III being connected to the output of said register II;
 one supplementary shift register of p bits ($R_R$) connected to said register (VI);
 one word generator for once per line loading said supplementary register with a predetermined word of p bits;
 clock generating means synchronized by the line synchronization pulses for controlling the loading and shifts of said registers;
 mixing means synchronized by the line synchronization pulses, connected to the output of said supplementary register and supplied by said television signal for providing a multiplex signal comprising said television signal without its synchronization pulses, said recognition sequence and said sequence of $4 \times n$ bits;
 decoding means receiving said multiplex signal for reconstituting said television signal and said analog signal.

11. A system as claimed in claim 10, further comprising one source of digital signals and one shift register ($R_N$) connected to the input of said register (I) and supplied by said digital signal, said mixing means being further synchronized by the frame synchronization pulses in such a way as, during the frame synchronization intervals, said multiplex signal comprises said digital signals following said sequences of $4 \times n$ bits.

* * * * *